United States Patent [19]

Ferrier et al.

[11] 4,274,609
[45] Jun. 23, 1981

[54] TARGET AND MISSILE ANGLE TRACKING METHOD AND SYSTEM FOR GUIDING MISSILES ON TO TARGETS

[75] Inventors: Noël H. L. Ferrier, Montmorency; Dominique C. N. E. M. de Ruffi de Ponteves, Versailles, both of France

[73] Assignees: Societe d'Etudes et de Realisations Electroniques; Societe de Fabrication d'Instruments de Mesure (SFIM), both of France

[21] Appl. No.: 900,331

[22] Filed: Apr. 26, 1978

[30] Foreign Application Priority Data

May 6, 1977 [FR] France ................................. 77 13911

[51] Int. Cl.³ .............................................. F41G 7/28
[52] U.S. Cl. ................................................. 244/3.14
[58] Field of Search .............................. 244/3.14, 3.11

[56] References Cited
U.S. PATENT DOCUMENTS

| 2,924,652 | 2/1960 | Kramskoy | 244/3.14 |
| 2,944,763 | 7/1960 | Grandgent et al. | 244/3.14 |
| 2,989,640 | 6/1961 | Turck | 244/3.14 |
| 3,406,402 | 10/1968 | Stauff et al. | 244/3.14 |
| 3,567,163 | 3/1971 | Kepp et al. | 244/3.14 |

Primary Examiner—Charles T. Jordan

[57] ABSTRACT

The invention relates to missile guidance and provides a method and system for guiding one or more missiles on to one or more targets. Aim on the targets and missiles is taken by means of two electro-optical pick-ups having a switchable field of view and supported on a stabilized and orientable platform. The pick-ups provide images displayed on screens and the corresponding video signals are processed by deviation measuring circuits which form tracking windows around the image of the targets and the missiles and determine their coordinates, the latter being addressed to a computing unit which generates guidance and steering commands transmitted to the missiles.

Application to the automatic guidance of missiles fired as a salvo from an anti-tank helicopter.

26 Claims, 10 Drawing Figures

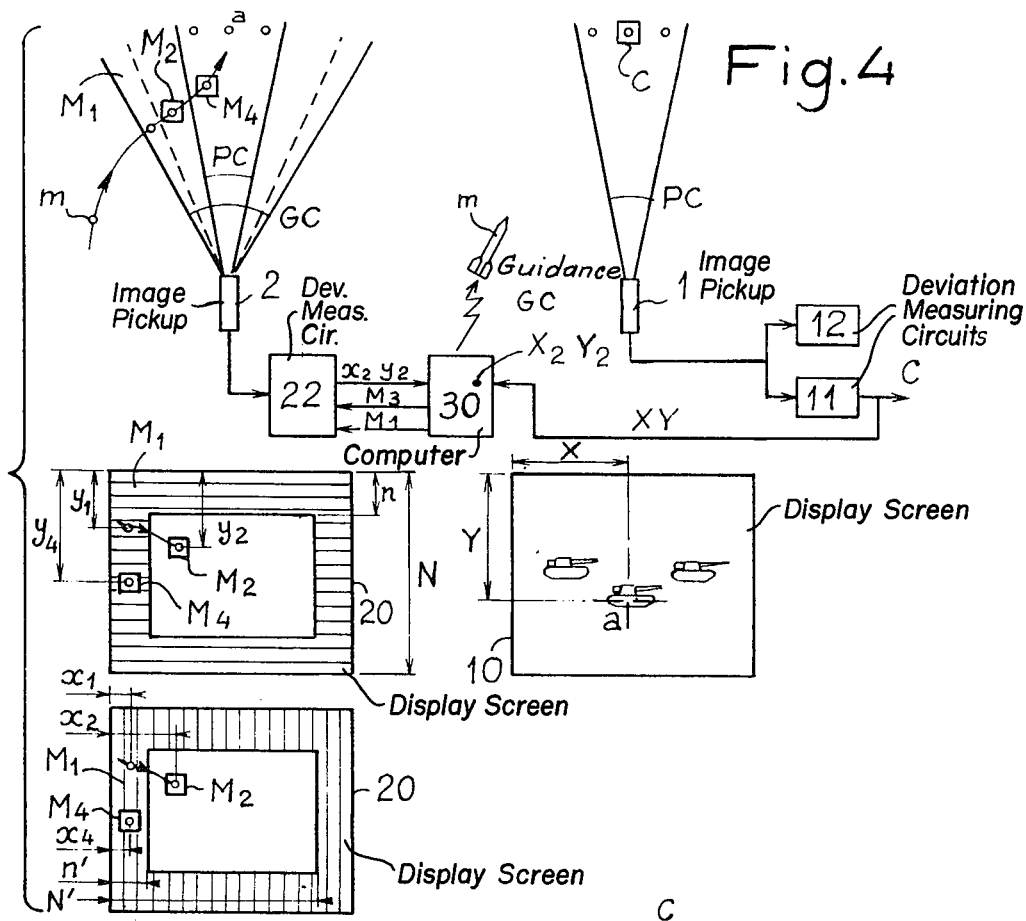
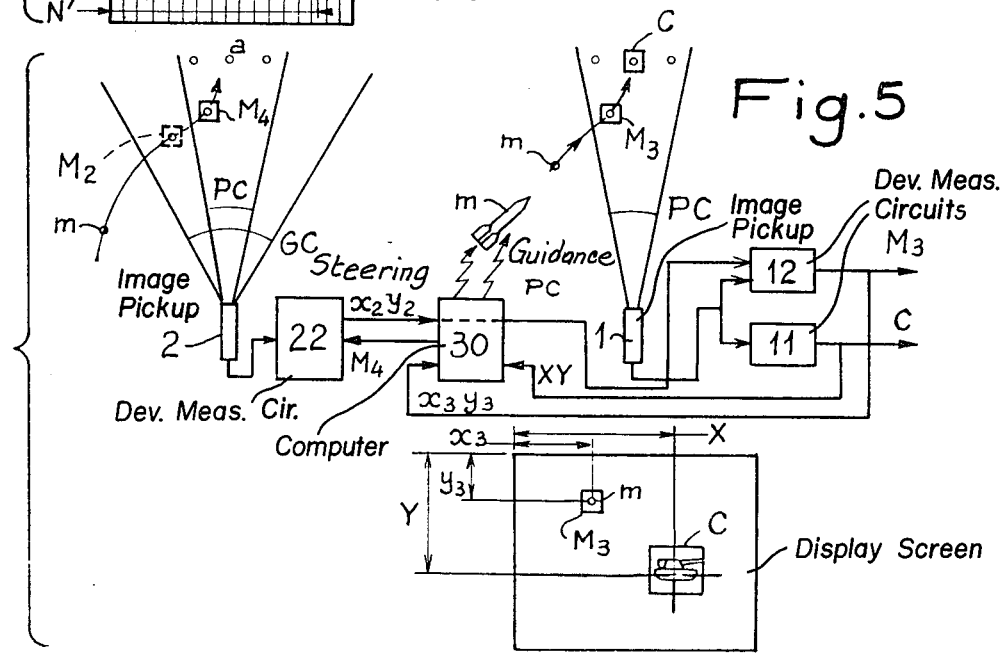

TARGET AND MISSILE ANGLE TRACKING METHOD AND SYSTEM FOR GUIDING MISSILES ON TO TARGETS

The present invention relates to a method and system for enabling one or more guided missiles to be fired against one or more different targets, either simultaneously or at intervals shorter than the time taken for a missile to cover the distance separating its launching ramp from the target at which it is aimed.

Already known are guided missile systems in which the apparent angular deviation, as seen by the aiming sight, between the sight-target axis and the sight-missile axis is measured by a goniometer or an infrared deviation measuring device. In such systems, the gunner aims at the target by means of an aim boresight.

A particularity and drawback which these measuring systems have in common is that they will allow only a single missile-target pair to be handled. This is obvious where the aim line or boresight is concerned, since a human operator can have only one target at a time in his boresight (usually materialized by a reticle projected to infinity by suitable optics). As for the goniometer used for such applications involving two outputs (azimuth and elevation), the preferred use made heretofore of a split-up disc spinning in front of a radiation detector precludes any simultaneous goniometric processing of a plurality of radiation sources if for no other reason than that the instrument is "blind" in the sense that, unless it is associated to display means, its operator has no way of knowing to which missile a given pair of azimuth and elevation angle measurements applies.

The appearance on the market of two new kinds of display apparatus based on television techniques now makes it possible to propose a novel combination of these means, well known per se, for the purpose of achieving the object primarily sought after within the scope of this invention, namely the ability for a single operator to attack a plurality of targets with a plurality of missiles, with the possibility of each target being hit by one or more missiles.

The first of the said two kinds of apparatus includes essentially the so-called television tracking systems. A particularity of these systems is that they employ one or more photosensitive detectors, or a photosensitive detecting surface placed behind suitable optics, to explore a solid angle (hereinafter referred to as the "explored field") and deliver, by scanning the explored field electronically or mechanically, a time-sequence of electric signals representing the variations in brightness in all the elementary directions of the explored field. Targets are generally characterized by a positive or negative singular variation in contrast, within the spectrum not only of visible but also of invisible radiation such as near or far infrared radiation. To such a variation in contrast there corresponds, within said time-sequence of electric signals, at a given moment, a variation in the level of said signals that relates to the detected variation in contrast. The applicants have accordingly designed electronic circuits capable of determining the instant of variation in the electrical level, and this in relation to the scanning position at that particular moment in time as measured likewise electrically, thereby to determine, likewise in the form of electric signals, the angular position of the target within the explored field.

In practice, the use of such systems merely requires that the gunner or operator use a television screen to latch on to one or more optronic devices for sampling the electric signals characterizing the angular position of the target and thereafter label them individually by means of an electrically coded signal.

Similar television techniques are used for the second, so-called "localizing" kind of apparatus, the function of which is to supply the angular coordinates of the missile. It should however be noted that this kind of apparatus can be simpler than that required for target detection and tracking. For in order to permit an opportune selection of the targets before possibly assigning a sampling device to them, the operator must first detect, recognize and identify them. The television section used for the first kind of apparatus will therefore need to be highly sophisticated (high geometrical quality, great sensitivity, wide passband for the associated electronics, etc.). By contrast, the television means associated to the localizer can be basically simpler. For since the missile carries a luminous tracer of well-defined emission spectrum, there is no difficulty in detecting and acquiring such tracer, this being effected at a short distance in any event, that is to say as soon as the missile is launched and almost always in proximity to the observation localizer, and moreover optronic observations of the landscape surrounding the missile is unnecessary and can be eliminated by the threshold principle. This being so, it is preferable to limit analysis of the explored field by the localizer to a numerical counting of the scanning lines before (or after) the appearance of the electrical singularity characterizing the line affected by the energy radiated by the tracer. The two distinct angular coordinates required to localize the direction of the missile can be obtained by scanning the field in a first direction (in azimuth, say) and then in a direction perpendicular thereto (in elevation, say). An example of such a system, entitled "TV angular localizer or angular deviation measuring system", is described in French patent No. 69/34912 and French Certificates of Addition Nos. 70/13014 and 70/46629.

As was indicated likewise for the system for locating targets by television, this missile-locating device must likewise be provided with electronic circuits such that the signals associated to the individually located missiles in the case of missiles fired in salvoes or in rapid succession can be sampled and likewise individually identified by an electrical code.

This invention has for its object to provide, on the basis of these known elements, a target and missile localizing system permitting fully automatic guidance of one or more missiles towards one or more targets.

Preferably, such system must be particularly well suited for anti-tank missile firings from a helicopter, for the important role which a helicopter armed with missiles can play in combats against tanks has long been clearly demonstrated. A major asset of the helicopter is its mobility, which enables it to surprise tank crews. In most of such anti-tank battles, however, helicopters are far fewer in number than the tanks and their relative vulnerability requires their strikes to be made rapidly. Further, as is well known, an attack made against a small heavily armoured target such as a battlefield tank implies the need for firing accuracy greater than sheer firepower. Consequently in future helicopter-tank battles it will be necessary for the helicopter armament not only to offer a high hit probability but to enable several targets to be selected at the same time and missiles to be fired in a salvo. This can be achieved only by means of a greater degree of automation, primarily in the target tracking and missile/target angular deviation measurement functions, in order to leave to the gunner only the tasks of observation and target selection, acquisition and firing.

The present invention accordingly has for its object a combat method and system adapted more particularly but by no means exclusively to helicopters and usable by day or by night against a plurality of moving targets simultaneously and most notably against battlefield tanks.

The invention relates more particularly to a method of attacking targets with self-propelled missiles capable of being launched in the direction of the targets with an initial trajectory which is pre-programmed according to the position which the missiles occupied on their ramps, in order that the missile or missiles be caused to penetrate after a certain flight distance into the field of view of optical aiming instruments and thereby be acquired and guided towards their respective targets.

This method, which allows guiding one or more missiles towards one or more targets by observing, detecting and localizing the targets and the missiles by means of image-forming optronic pick-ups which deliver their information in the form of electric signals, consists basically in determining electronically the angular coordinates of a target from the image thereof formed by a pick-up, in firing a missile and in guiding it according to the differences between said target coordinates and the missile angular coordinates, the latter being determined by processing the electric signals corresponding to the images received by said pick-up with different fields of view.

In accordance with this invention, the following operations are preferably performed through the agency of two simultaneously operating optronic pick-ups having parallel and jointly orientable boresights:

(a) observation, detection and identification of the targets on the basis of the image furnished by one of the pick-ups (which are then directed towards the targets) and appearing on display means such as a screen or an eyepiece;

(b) acquisition of a target by manually controlled marking thereof on the image furnished by one of the pick-ups and appearing on the display means;

(c) electronically determining the coordinates of the target seen by said pick-up and tracking the same;

(d) firing of a missile and electronically detecting the same when it penetrates into the field of view of one of the pick-ups;

(e) electronically determining the coordinates of said missile and tracking the same on the basis of information supplied by the pick-ups; and (f) computing the coordinates of the target and those of the corresponding missile and generating guidance commands sent to the latter.

With such a method the tasks remaining to be performed by the gunner are thus limited to the strict minimum, namely observing the landscape, aiming the pick-ups at the detected targets, observing and identifying the same and thereafter acquiring a target, these last operations being performed with the aid of display means which give the gunner a visual presentation of the landscape and the targets therein. Once the gunner has then fired a missile, guidance thereof towards the marked target takes place entirely automatically since target tracking is effected by electronic means on the basis of the image received from one of the pick-ups, without any further intervention on the part of the gunner. Thus it will readily be appreciated that this method enables the aimer/gunner to very rapidly attack multiple targets with multiple missiles fired in a salvo, the targets being marked down one by one, it sufficing for the purpose to provide for simultaneous electronic processing of the images received by the pick-ups from the different targets and from the missiles fired against them.

In accordance with this invention, it is necessary to use two optronic pick-ups, each offering a large and a small field of view.

Insofar as the targets are concerned, the same are preferably detected with the large field of view, whereas their identification, acquisition, coordinate determination and tracking are performed with the small field of view.

Where the missiles are concerned, acquisition of a missile after it is fired is preferably effected with the large field of view, whereas coordinate determination and tracking thereof are effected with the large field of view during a first phase and thereafter with the small field of view during a second phase. Preferably, guidance of a missile towards a target during the first phase is effected by sending steering commands which are generated by comparing the missile and target coordinates, both sets of coordinates being determined with the large field of view and the target coordinates being computed from the target coordinates determined with the small field. Guidance during the second phase is effected by sending steering commands generated by comparing the missile and target coordinates determined with the small field of view.

It is accordingly necessary that acquisition of the targets and determination of the coordinates and tracking of the missiles in the first and second phases, and of the missiles in the second phase, be effected by means of one of the pick-ups—referred to as the "first pick-up"—with the small field of view; and detection, coordinate determination and tracking of the missiles in the first phase by means of the other pick-up—referred to as the "second pick-up"—with the large field of view.

The subject method of this invention enables a missile to be guided towards a target during the second phase on the basis of the differences between their respective coordinates given by the image supplied uniquely by the first pick-up. This method of generating guidance commands circumvents all problems of harmonizing the two pick-ups used. There is no need to harmonize them mechanically since they do so dynamically as a result of the incoming data processing method set forth herein.

During the second phase, the second pick-up no longer has a guidance function; it can consequently be used advantageously with a small field of view for the purpose of determining therein the coordinates of a guided missile and their variations for the purpose of generating steering commands to be sent to the missile.

In order to permit target observation and acquisition by night as well as by day, a pick-up suitable for night vision should be used as the first pick-up. The second pick-up, on the other hand, can be merely a daylight vision pick-up with a higher power of resolution than the first pick-up, since this does not preclude its use both by day and by night for missile image forming since the missiles normally have a tracer or a very brightly burning propulsion unit.

As already indicated, in carrying the subject method of this invention into practice it is possible and desirable to simultaneously process, for the purpose of acquiring a plurality of targets and missiles and determining their coordinates, the pick-up-supplied information relating to a plurality of targets and missiles, these objects being possibly viewed in different fields of view.

This invention further relates to a system for carrying the above-described method into practice, which system is designed to take advantage of said method in such a way as to permit a plurality of targets and missiles to be handled simultaneously.

The description which follows with reference to the accompanying non-limitative exemplary drawings will give a clear understanding of how the invention can be carried into practice.

In the drawings:

FIG. 1 is a block diagram showing the general organization of the system;

FIGS. 2 through 6 schematically illustrate various stages in the subject method of the invention;

Figure 1:
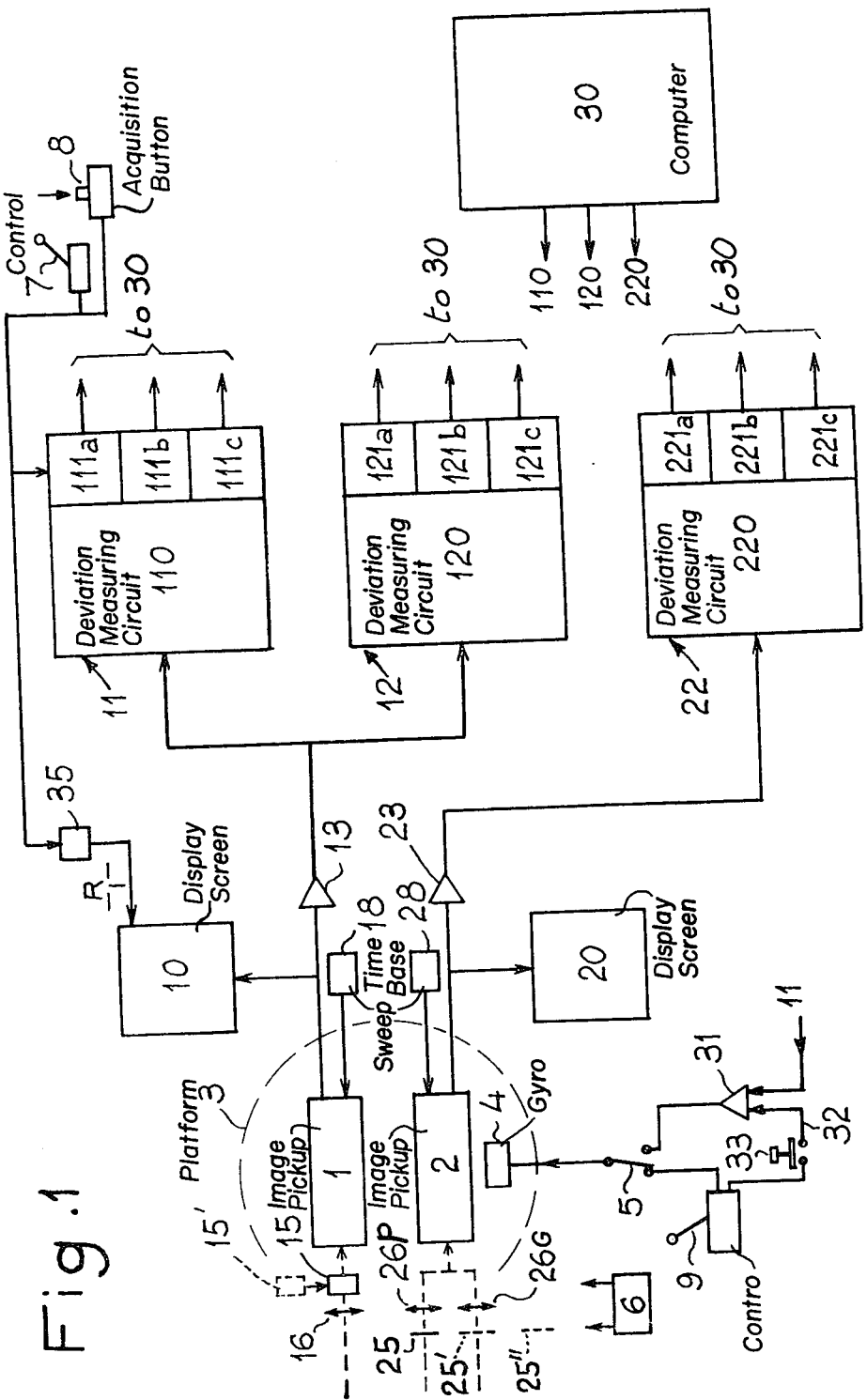

Reference to FIG. 1 shows that the system includes two optronic image pick-ups 1 and 2 contained inside a platform 3 slaved and stabilized by a gyroscope 4. Preferably, this platform is the one described in French patent application No. 75/36999. Pick-up 1 is a night vision pick-up of a kind well known per se, namely an infrared camera, a low-light-level camera or a thermal imaging camera. Placed before this pick-up are optical means which give it an image enlarged several times in order that the observer-gunner may have a sufficiently wide field of view considering the deployment of targets in the field—such as advancing tanks—to encompass a plurality of targets viewed at a distance corresponding to a medium range for the missiles. These optical means may be formed by a large field (GC) lens 16 to which is associated a Galileic device 15 retractable to 15' and providing the enlargement needed to obtain a small field (PC). Pick-up 2 is a daylight pick-up well known per se, being preferably a television camera having a silicon-sensitive surface, before which a multiple-field optical system is placed. Such optical system may be formed by lenses 26G, 26P giving large and small fields of view respectively and capable of simultaneously illuminating the sensitive surface of pick-up 2. Positioned before these lenses is a movable shutter 25 capable of either masking lens 26P at 25' (the large field lens 26G being operative) or mask the lens 26G (the small field lens 26P being operative) or be retracted to 25", in which case pick-up 2 receives a large field image and a small field image superimposed on each other. GC/PC switching of the optical means of pick-ups 1 and 2 is effected by a manual control 6. Alternatively, lenses of variable focal length could be used.

The orientation of platform 3 and the common direction of the boresights of pick-ups 1 and 2 which it supports can be altered by means of a control stick 9.

Pick-ups 1 and 2 are connected to scanning time-bases 18, 28 respectively that provide sequential line scanning of the images they receive. These images are displayed at the observation and fire control post on screens 10, 20 respectively which here form the display means (alternatively a single screen could be used for both pick-ups). The corresponding video signals are furthermore applied, through video amplifiers 13, 23, to deviation measuring circuits 11 and 12 for pick-up 1, and 22 for pick-up 2. Associated to a computing unit 30, these circuits have as function to automatically track one or more targets and guide and steer one or more missiles towards their respective individual targets. A control stick 7 and a button 8 permit manual acquisition of each selected target, as will be explained in greater detail hereinafter.

Circuits 11, 12, 22 are of similar structure and circuits 12 and 22 in particular are almost identical. Each of these circuits comprises a common section 110, 120, 220 to which are associated the same number of complementary sections as the number of targets to be attacked simultaneously; these sections are shown as being three in number in the drawings and are designated by reference numerals 111a, b, c, 121a, b, c, 221a, b, c.

Figure 2:
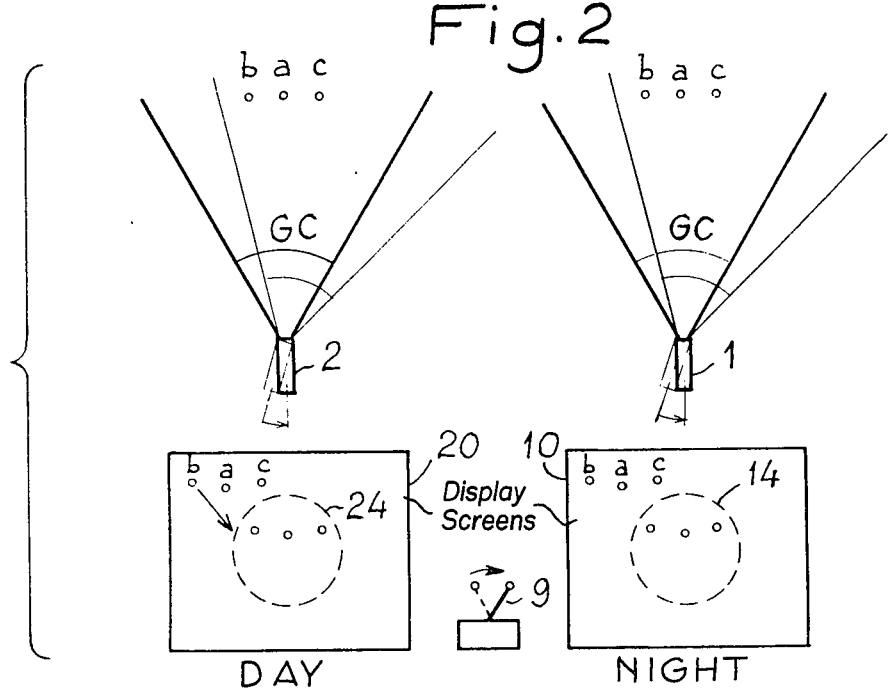
Figure 3:
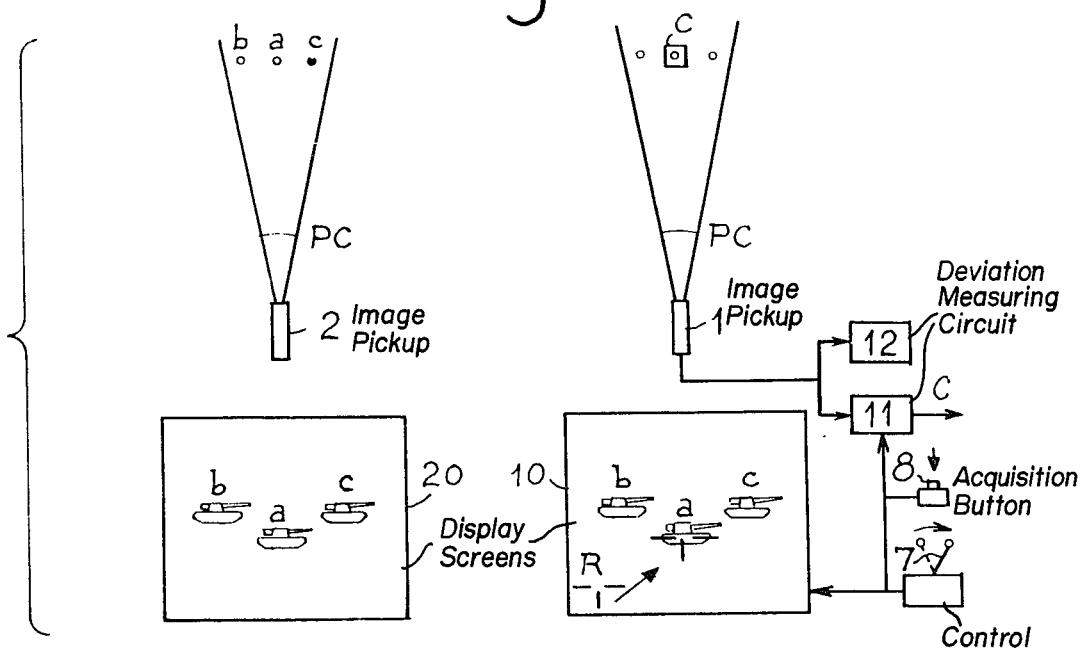

Battlefield observation is effected with the large field of view (FIG. 2), by day with optical pick-up 2 and by night with optical pick-up 1, whereas identification of targets a,b,c (FIG. 3) is effected with the small field of view. For battlefield observation and target identification and acquisition, aiming control is by means of operator's control stick 9 which causes precessing of gyroscope 4, which gyroscope slaves platform 3 supporting optical pick-ups 1 and 2. By means of control stick 9, the observer orientates platform 3, by day or by night, so as to fetch the target or targets into the small field of view of pick-up 2 or 1, displayed on the associated screen 20 or 10 by, say, a luminous circle 24, 14 that appears when observations are made with the large field of view.

In order to identify one or more targets (FIG. 3), the operator uses the device 6 to command a change of field in pick-up 2 by day and a change of field in pick-up 1 by night in order to switch to the small field of view. The gunner-observer selects a first target on screen 20 or 10, which he tags by using the stick 7 to shift an electronic reticle R and place it over the image of the first chosen target a viewed on screen 10, that is to say in effect in order to inscribe the target within an electronic window C and thereby cause the video signals to be analysed only therein. When the reticle R coincides with the chosen target, the gunner-observer presses button 8, thereby triggering automatic tracking of the target. This results from the generation, by suitable processing of video signals in circuit 11, of tracking deviation signals, this being accomplished by means of electronic circuitry well known per se, operating for instance by analysing the contrast exhibited by the target in its window C or by image correlation. Such circuitry furnish the target centre, this being designated by the production of a pulse to enable its coordinates to be measured.

Circuit 11, which generates the window C circumscribing the target, thus also furnishes the coordinates X, Y of the target centre which are applied, in addition to computing unit 30 (FIGS. 4 and 5), on the one hand to the window generator of circuit 11 whereby to automatically centre the window C over the target image received, and on the other, after tripover of a switch 5 (FIG. 1) controlled by button 8, to the inputs of amplifiers 31 controlling precession of gyroscope 4, thereby to slave platform 3 to tracking of the target. Control via the stick 9 can be maintained (with diminished effectiveness) by means of a link 32 controlled by a button 33 positioned on control stick 9, in order to enable the gunner-observer to refine the tracking if necessary.

Once the target has been tracked thus automatically, a missile m is fired and constrained by preliminary commands to penetrate into the large field of view of pick-up 2 (FIG. 4). This missile carries a light emitting source which is seen by pick-up 1 and pick-up 2, both by day and by night. The direction along which the missile will penetrate into this field of view cannot be known beforehand, especially if the missile is fired from a helicopter in flight. On the other hand, the missile must be acquired very quickly as soon as it appears in the field of view; further, there must be no way in which the image of the missile tracer can be confused with other sources of light that may exist on a battlefield, such as flashes, flames, explosions, and so forth. These problems are overcome by a means that renders detectable, as a light source, only that source whose image appears on the fringe of the large-field-of-view image of pick-up 2, which means consists in creating a peripheral window M1 (FIG. 4) bordering the large field of view, the whole of the internal surface of window M1 being desensitized. The dimensions of the bordering area of the desensitized zone are adjusted by computing unit 30 which generates desensitizing commands as a function of numbers of scan lines and dots on the scan lines n,N,n',N', the screen 20 being alternately scanned horizontally and vertically, these numbers being inputted beforehand into computing unit 30.

The coordinates $x_1, y_1$ of the missile m appearing in peripheral window M1 are measured, thereby permitting generation of a second window M2 surrounding the missile seen in the large field of view and following its changing coordinates $x_2, y_2$, which are applied to computing unit 30. In addition, the coordinates X,Y of the target seen by pick-up 1 are converted, by computing unit 30 which takes account of the different fields of view and of the different numbers of scan lines of pick-ups 1 and 2, into revised coordinates $X_2, Y_2$ as if the target were seen by pick-up 2. A comparison by a comparator in computing unit 30 between the missile coordinates $x_2, y_2$ and the revised target coordinates $X_2, Y_2$ furnishes error signals which after being processed are converted into guidance commands transmitted—by radio for example—to the missile m in order to correct its trajectory. The missile is then guided from within the large field of view of pick-up 2.

This first guidance phase, made with the large field of view, is relatively imprecise, the more so in that the nearer the missile gets to the target the further it recedes from the firing unit. After this initial phase therefore, a more precise guidance phase using the small field of view must be provided.

There comes a point when the missile penetrates into the small field of vision of pick-up 1, which up to then saw only the target, and this missile can be detected by deviation measuring circuit 12. In order to ensure that the tracer image that now appears in the small field of view of pick-up 1 is not confused with some other light source, an electronic window M3 is positioned on standby in said field (FIG. 5) on the basis of the data from deviation measuring circuit 22 associated to pick-up 2. The position and area of the window M2 centred upon the missile image seen by pick-up 2 are defined by numbers of horizontal and vertical scan lines, and these data are transcribed to allow for the different field of view and the different number of scan lines of pick-up 1 whereby to switch from window M2 to window M3. When the image of missile m appears in window M3, the deviation measuring circuit 12 associated to pick-up 1 and the computing unit 30 detect this image, measure its coordinates $x_3$ and $y_3$ and generate further windows M3 of area and position depending on the updated dimensions and positions of the image of missile m as the latter travels towards the target. Thereafter the computing unit 30 generates the missile-target differences $X-x_3$ and $Y-y_3$ and, after appropriate processing, translates them into guidance commands sent to the missile in order to steer it onto the target.

The measurements obtained by deviation measuring circuit 22 associated to pick-up 2 and computing unit 30, which theretofore served to guide the missile during the first phase are used during the second small-field guidance phase to steer the missile. The optical means 15,16 placed before pick-up 1 must not have too small a field angle $\alpha$ in order to be able to encompass a plurality of targets according to battlefield conditions. Further, pick-up 1, which is the night vision pick-up, has its definition given by its number of scan lines L. Whereas its resolution $(\alpha/L)$ is satisfactory at maximum missile range for accurately measuring missile-target deviations, it is not capable of meeting the missile steering requirements beyond a moderate range. Since pick-up 2 is a pick-up of far better definition and since the field of its optics 26P is smaller, it is able by means of its deviation measuring circuit 22 to furnish the small-field coordinates of the missile, which coordinates can be used after being processed to determine the speed and acceleration of the missile and generate trajectory correction commands.

These new coordinates are obtained by using the large-field coordinates of the missile circumscribed by window M2 and feeding them to computing unit 30 which, on the basis of the large-field/small-field ratio of lenses 26G,26P of pick-up 2, effects a change of scale to derive the coordinates of a standby window M4 in the small field of view (FIGS. 4 and 5). When the missile penetrates into the small field, its image appears therein and deviation measuring circuit 22 detects it and measures its coordinates. It should be noted that the missile image in the small field exhibits a much higher video level than the small image viewed in the small field, thereby assisting the measurement to be made.

Appearance of the missile in small-field window M4 causes elimination of large-field window M2.

Thus, during the second phase, pick-up 2 and its deviation measuring circuit 22 are used to steer the missile and pick-up 1 and its deviation measuring circuits 11 and 12 to guide it to the target.

Figure 7:
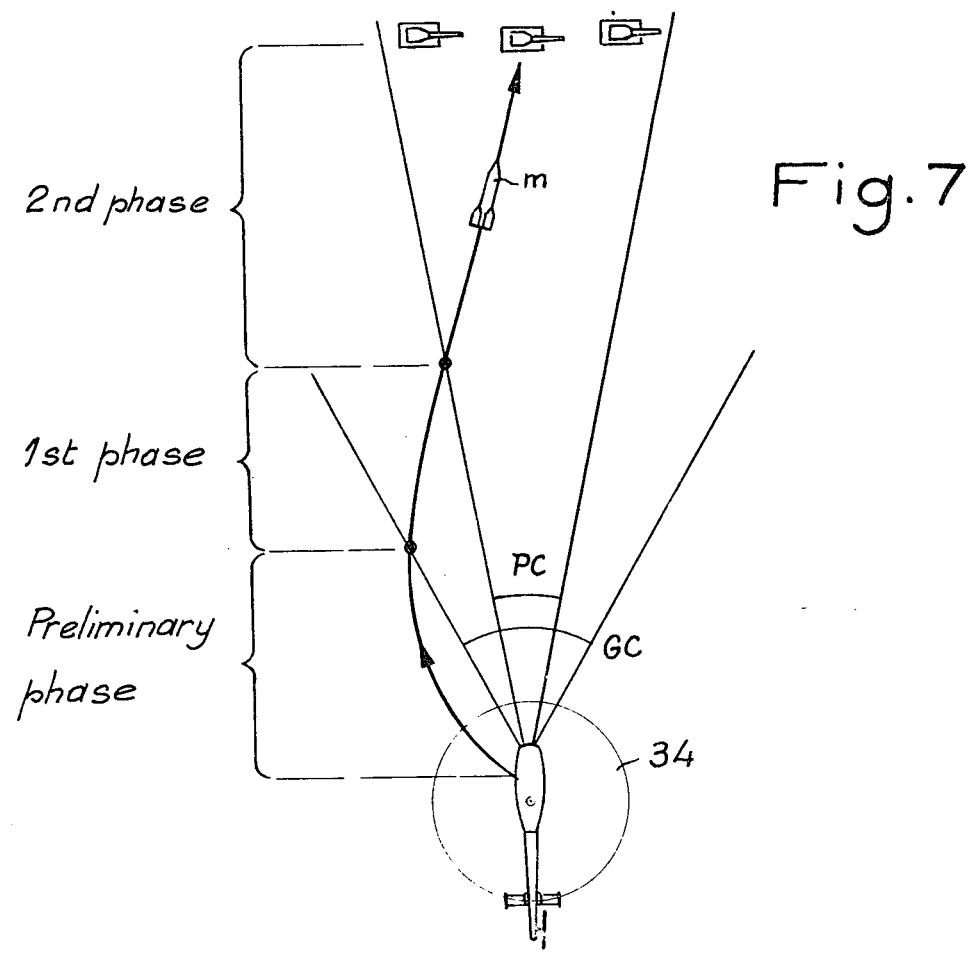
FIG. 7 shows diagrammatically the unfolding of the successive guidance phases along the trajectory of a missile.

FIG. 7 illustrates the different guidance phases in the course of the missile trajectory: the preliminary phase during which the missile, having been fired from a helicopter 34, is simply programme-directed to penetrate into the large field of pick-up 2, the first phase during which the missile is guided within this field, and the second phase during which it is guided within the small field of pick-up 1, where it is steered according to its coordinates measured in the small field of pick-up 2.

Figure 8:
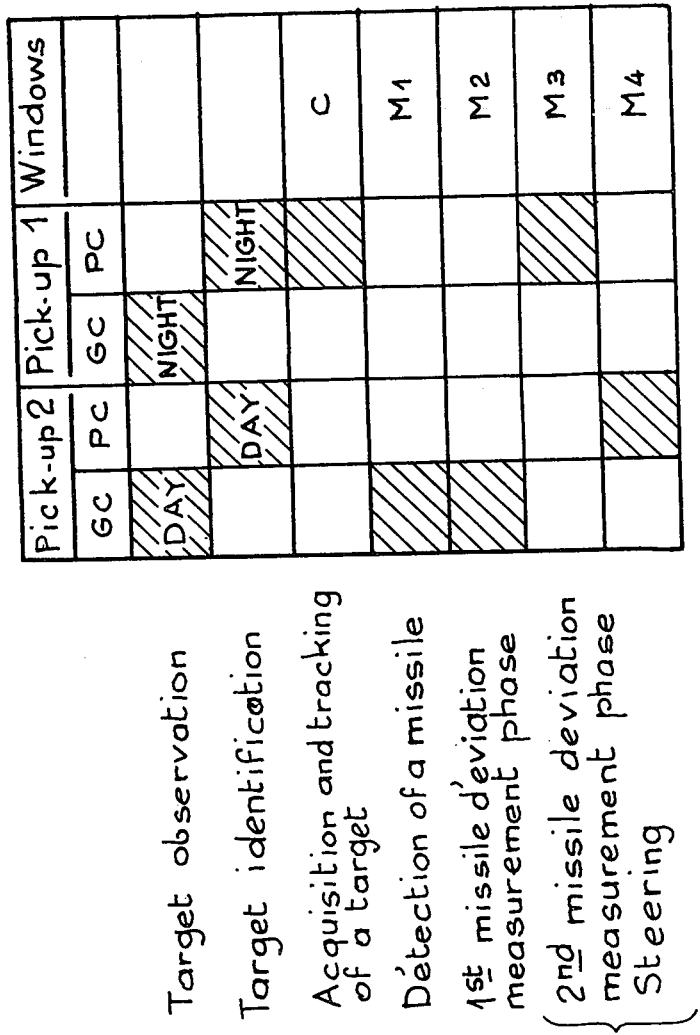
FIG. 8 is a tabulation of the various utilization modes of the two pick-ups.

The table in FIG. 8 recapitulates the various utilization modes of pick-ups 1 and 2 as set forth precedingly, and this for a single missile. The table also indicates the series of correspondingly formed windows, to wit target window C, the first or peripheral window M1, the second window M2, the third window M3 and the fourth window M4, these four last-mentioned windows relating to the missile.

It is to be noted that, of these windows, peripheral window M1 is fixed whereas windows C, M2, M3 and M4 are mobile and follow the images of the target or the missile during their motions.

When it is required to fire missiles at a plurality of targets, for instance three targets a,b,c, each target is acquired in succession as explained precedingly by operating on control stick 7 and then on button 8 for the switch to automatic tracking, a missile being fired as soon as a target is acquired and tracked. Alternatively, all the targets may be acquired and tracked and a corresponding number of missiles can then be fired in a salvo. The most appropriate method depends primarily on the relative positions of the targets and on their distance. When several missiles are fired, a possibility would be for the gunner to assign a particular missile to a particular target depending on the order in which the missiles appear within the field of view of pick-up 2. The choice of missile assignment can also be done automatically by computing unit 30: for instance, the latter can direct the first missile at the farthest target (the distance being measured by a complementary device such as a laser range-finder mounted on platform 3).

Figure 6:
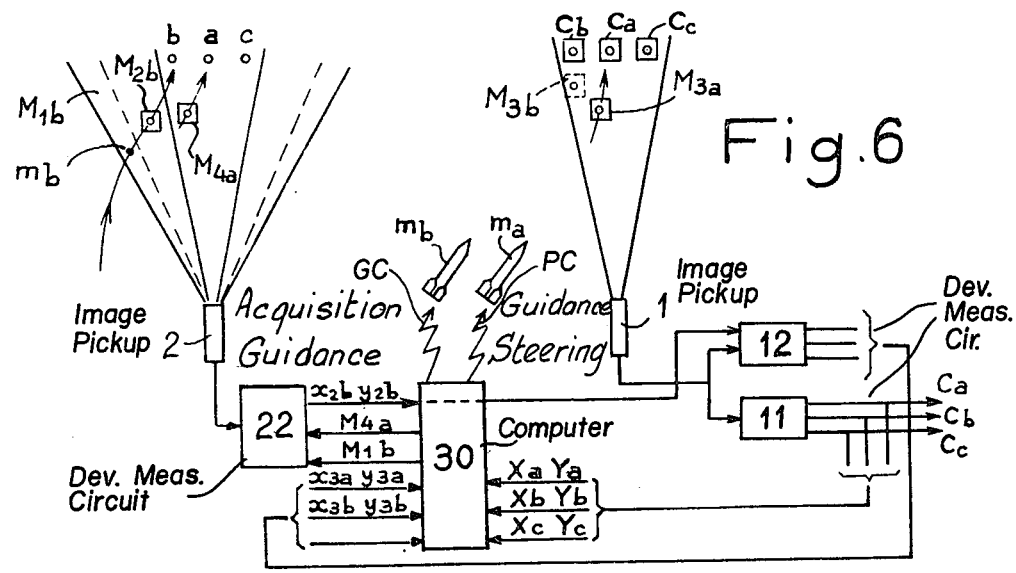

By way of example, FIG. 6 illustrates the case where three targets a,b,c, have been framed by windows Ca,Cb,Cc in the small field of pick-up 1 and where a missile $m_a$ is in the second phase of its trajectory and is being guided on a window M3a ($x_{3a}, y_{3a}$) and steered within a window M4a towards the target a ($X_a, Y_a$), while a second missile $m_b$ has just appeared in the large field of pick-up 2, that is in the peripheral window M1b and is about to begin its first guidance phase. Jointly with computing unit 30, circuit 22 then generates both a window M4a for missile $m_a$ and a peripheral window M1b for missile $m_b$, this last window permitting acquisition of missile $m_b$ before its large-field guidance within a window M2b likewise formed by circuit 22, followed by small-field guidance within a window M3b formed by circuit 12 of pick-up 1.

Figure 9:
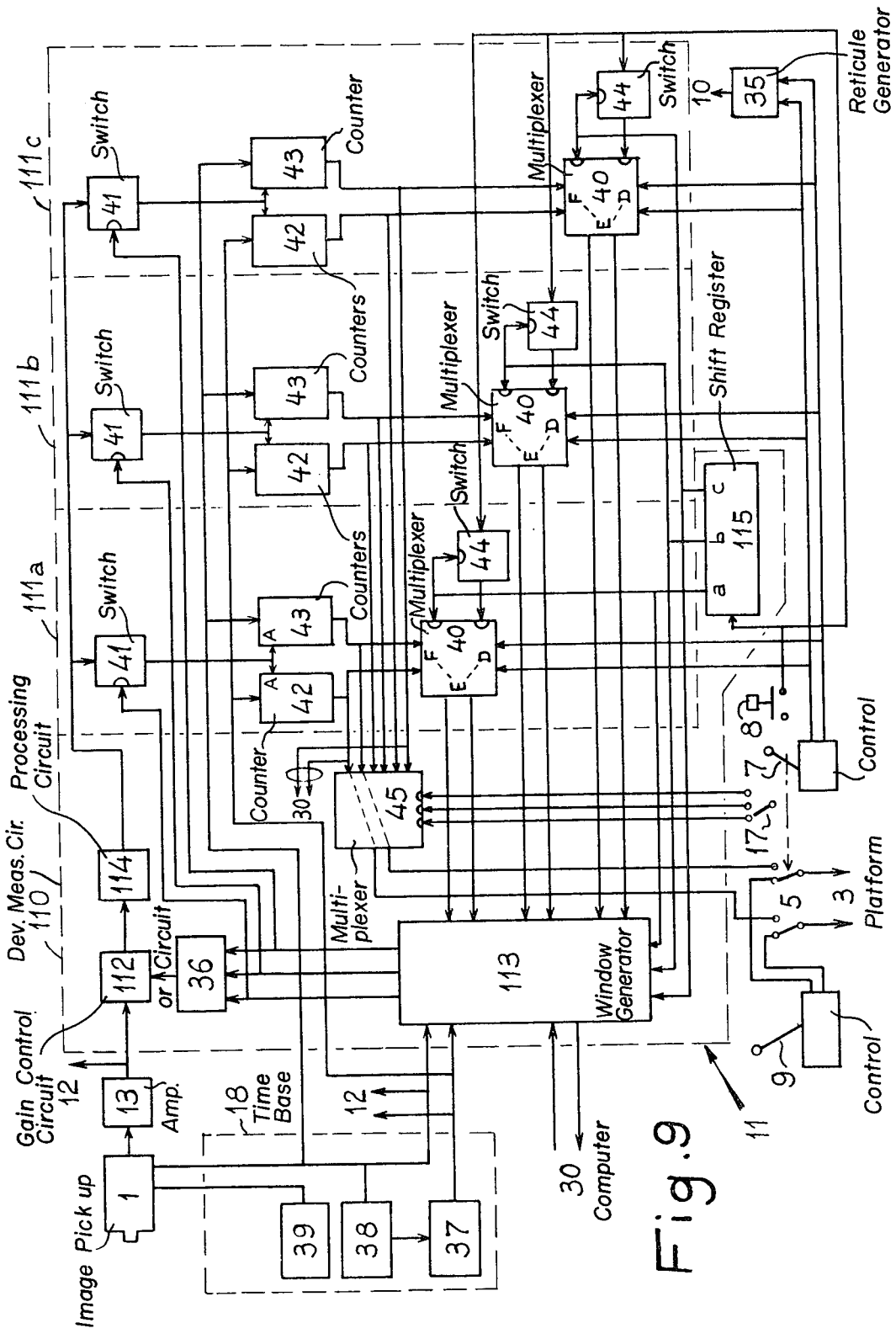
FIGS. 9 and 10 are block diagrams of the deviation measuring electronic circuits used in the subject system of this invention.

FIG. 9 is a functional block diagram of electronic deviation measuring circuit 11 for three targets a,b,c, comprising a common portion 110 and three identical complementary sections 111a,111b, 111c. When the first target a is acquired, control stick 7 shifts the slides of two potentiometers (for elevation and azimuth respectively) and the analog voltages they deliver are converted into digital signals applied to a multiplexer 40 which, under the control of a shift register 115, initially effects a link D-E and transmits to a window generator 113 commands stemming from movements of the stick 7 whereby to fetch reticle R (FIG. 3) over the image of target a. The reticle R is generated by a reticle generator 35 to which the commands issuing from stick 7 are likewise applied.

Window generator 113 generates a gate defining the aperture of a window C, which is applied via a hook-up circuit 36 to a gain control circuit 112 located past the video amplifier 13 of pick-up 1, whereby of all the video signals displayed on screen 10 only those received within that window are applied to a processing circuit 114. Window generator 113 also controls closure of a switch 41 which applies the output from circuit 114 to "stop" inputs A of two counters 42,43 which receive the clock signals from time bases 37,38 respectively at the dot and line scan frequencies of pick-up 1. Counter 42 is reset at each line flyback and counter 43 at each vertical-scan retrace (delivered by vertical scan clock 39 of time base 18).

When the target is inscribed within window C, processing circuit 114, upon detecting the target centre, stops the counting in counters 42 and 43 and the number of spots and the number of lines then correspond to the target coordinates X and Y and the latter are memorized at the inputs F of multiplexer 40. The signals at inputs F and D of multiplexer 40 are then in the same logic state since the gunner holds the reticle R over the target image by operating on control stick 7. The gunner then switches to automatic tracking by pressing button 8 which, through a switch 44 closed by register 115, eliminates the hook-up D-E in multiplexer 40 and replaces it by hook-up F-E, whereby window generator 113 no longer receives the manual tracking signals but the target position signals given by counters 42 and 43. The deviation measuring loop formed thus automatically maintains the window C formed by window generator 113 around the target image. The outputs from counters 42 and 43 are furthermore applied to computing unit 30 and, via a multiplexer 45, to the gyroscope 4 of platform 3 in order to slave the same to the boresight of the most promising of several targets selected by the gunner by means of a selector 17.

The switch in operating mode from manual tracking to automatic tracking causes register 115 to shift by one step and to open switch 44 of section 111a in order to segregate the latter's multiplexer 40 from further commands generated by control stick 7, and closes the switch 44 of the next section 111b thereby to cause the latter's multiplexer 40 to receive the commands issuing from stick 7 as the gunner uses the latter to move the reticle over the image of the second chosen target b.

Once the three targets a,b,c in question have been acquired, they are tracked automatically by the three deviation measuring loops 110-111a, 110-111b, 110-111c of circuit 11, the window generator 113 generating three windows Ca,Cb, Cc which are applied together to gain control circuit 112 and separately to switches $41a,b,c$ whereby to correspondingly open access to the counters $42,43a,b,c$ that supply the coordinates $X,Y_{a,b,c}$ of the three targets.

Figure 10:
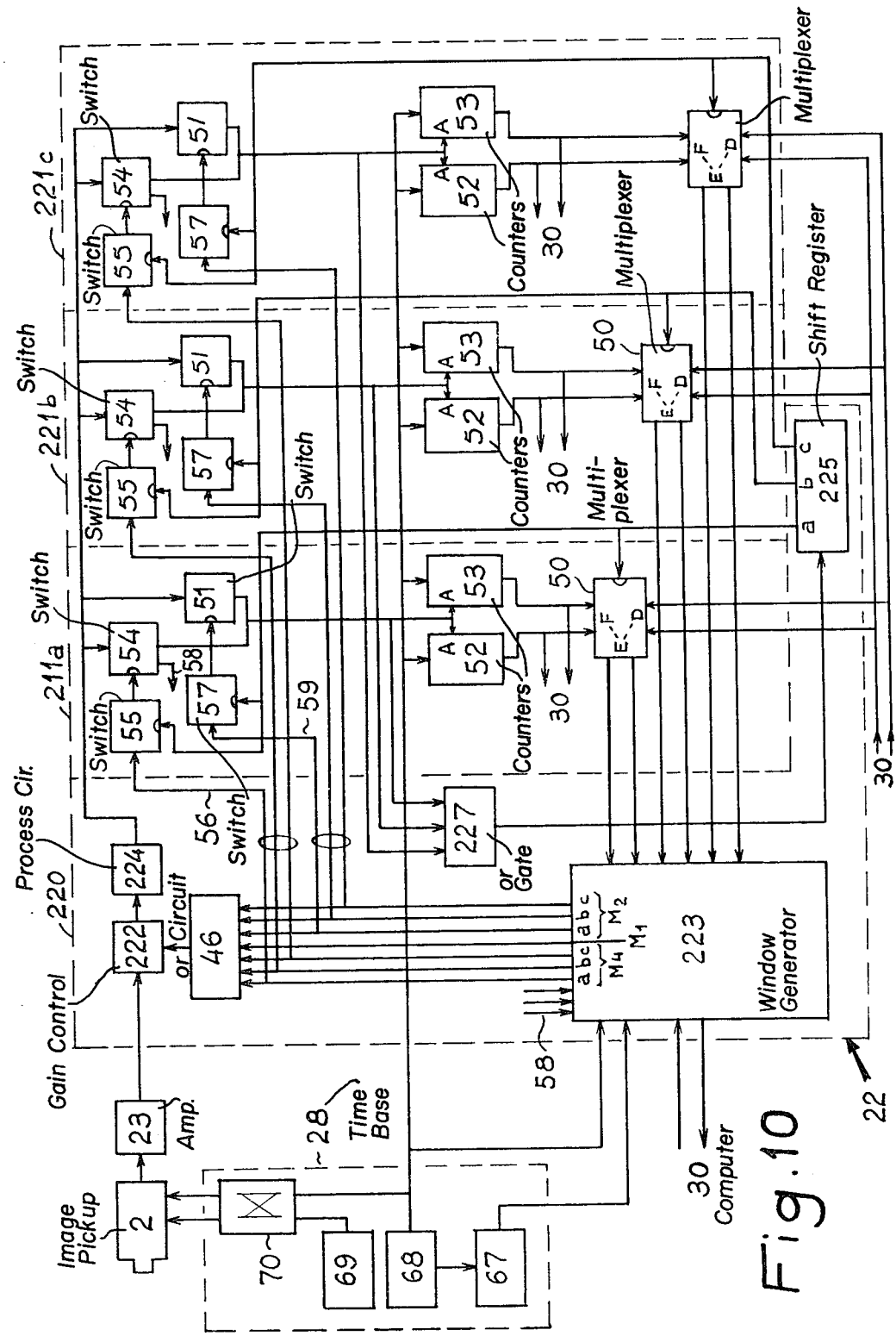

FIG. 10 is a block diagram of the missile detection and deviation measuring circuit 22 which, like circuit 11, includes a common portion 220 and three special-purpose sections 221a,221b,221c likewise forming three deviation measuring loops. A shift register 225 is initially effective in causing a multiplexer 50 (that of section 221a) to establish a link D-E which conveys to a window generator 223 the commands from computing unit 30 for forming the standby window M1 on the fringe of the field of vision of pick-up 2. Via a uniting circuit 46, window generator 223 controls, through a gain control circuit 222, a window aperture whereby the processing circuit 224 receives only those video signals from pick-up 2 which correspond to the peripheral window M1. Window generator 223 also controls the closure of a switch 51 via a link 59 and a switch 57 controlled by register 225. Switch 51 applies the video signal corresponding to standby window M1 to the "stop" inputs A of two counters 52 and 53 which receive the line frequency signals from clock 68 of time base 28. This clock and a further clock 69, which delivers scanning signals at the image frequency and resets counters 52 and 53, are connected to pick-up 2 through a multiplexer 70 the function of which is to successively invert the scans of pick-up 2. A third clock 67 delivers signals which correspond to the numbers of spots on a scan line and which are applied to window generator 223. When the image of the missile appears in peripheral standby window M1 it is detected during each horizontal or vertical scan and a signal is delivered via processing circuit 224. At each successive scan this signal disable counter 52 or counter 53 at numbers of scan lines that correspond to the missile coordinates $x_1$ and $y_1$. The missile detection signal is applied through an OR gate 227 to register 225 which shifts by one step. Register 225 thus places multiplexer 50 in a E-F switching state to transmit the missile coordinates (stored in counters 52 and 53) to window generator 223; it is also effective in causing the multiplexer 50 of the next section 221b in establishing a link D-E; lastly it causes closure of this last section's switch 57. Window generator 223, which receives the data $x_2,y_2$ from counters 52 and 53 of section 211a, generates a missle isolating window M2 which is substituted for the window M1 on link 59. The commands for generating peripheral window M1 are sent by multiplexer 50 of section 221b to window generator 223 which, by operating on gain control circuit 222, holds the generated peripheral window until the appearance of a second missile $m_b$, the coordinates of which will be determined in section 221b by counters 52 and 53 which will receive the video signal from processing circuit 224 via the corresponding switch 51 the relevant channel of which will be enabled by switch 57 controlled by window generator 223. The coordinate data for the first missile $m_a$ stored in counters 52 and 53 of section 221a are transmitted to computing unit 30.

For it to be feasible to track a plurality of targets and guide a missile to each one of them, it must be possible for the pick-up 2 to simultaneously steer a missile with the small field of view and acquire a second missile and then a third with the large field of view. This can be accomplished with the same pick-up by analysing two images: a large-field image and a small-field image which are superimposed on the sensitive surface of pick-up 2 by means of the optics described precedingly with reference to FIG. 1.

Thus when a missile is guided into the large field of pick-up 2 it ultimately penetrates into the small field thereof. As explained precedingly, a standby window M4 is formed in said small field. This window is generated by window generator 223 receiving information from computing unit 30 and is applied via a link 56 to a switch 54 through a switch 55 controlled by register 225. When the missile appears in window M4, switch 54 is effective in firstly arresting, through a link 58, the formation by window generator 223 of the large-field window M2 for that particular missile, and secondly in applying the signal received to counters 52 and 53, at the same time as switch 51 is opened by reason of the disappearance of window M2. Counters 52 and 53 then deliver the coordinates $x_4,y_4$ of the missile seen in the small field of pick-up 2, and these coordinates are used to steer that missile.

In the case of a plurality of missiles, the operations unfold in the same way in the other sections 221b, 221c, .... These operations may overlap. For instance, window generator 223 may generate at the same time a window $M4_a$ for steering a first missile $m_a$, a window $M2_b$ for large-field guidance of a second missile $m_b$ and a peripheral window $M1_c$ for acquisition of a third missile $m_c$, or else three steering windows $M4_a, M4_b, M4_c$.

The missile localizing circuit described precedingly, functioning by alternate scanning of the optical sensor and counting of the numbers of lines, has already been disclosed by French patent No. 69/34912 and its two Certificates of Addition Nos. 70/13014 and 70/46629. The circuit described herein can be adapted and improved from the teachings of these prior documents.

Pick-up 1 is connected not only to a deviation measuring circuit 11 but also to another deviation measuring circuit 12 which generates a window M3 around each missile, firstly from the coordinates $x_2,y_2$ converted by computing unit 30 and thereafter by small-field tracking with pick-up 1 with delivery of the coordinates $x_3,y_3$ of the missile as seen in the small field. The circuit 12 (not shown) is almost identical to the circuit 22 shown in FIG. 10. The only differences in circuit 12 are as follows: the counters 52 receive the signal from the spot synchronizing clock 37 (FIG. 9) instead of a line synchronizing clock signal (the scanning of pick-up 1 not being alternating); the multiplexers 50 receive the commands for generating standby window M3 (not M1) from computing unit 30; lastly, switches 54 and 55, being unnecessary, are dispensed with.

Throughout the foregoing, the target and missile coordinates have been related to lateral reference axes bordering the field of view, but it goes without saying that the reference axes could be placed in different positions; for instance, they could intersect at the central point corresponding to the boresight.

In order to optimize operation of the system described hereinbefore, for visible or invisible optical frequency bands in which pick-ups 1 and 2 operate respectivley could be appropriately chosen so that the tracer radiation sources on the missiles give little-diffracted optical images and so that land-based targets produce sufficiently contrasted images at pick-up level to enable them to be discerned against the landscape. Moreover, as is known, the earth's atmosphere does not lend itself to all the technologically feasible optical and infrared frequencies. One possible optimum combination for the frequency bands of pick-ups 1 and 2 is obtained by assigning an infrared frequency band (8 to 15 micrometers, say) to pick-up 1 and, to pick-up 2, a visible-spectrum and near-infrared frequency band corresponding to that of a Vidicon tube provided with a sensitive silicon surface. Neutral or selective filters of given density can be used in order to optimize the pick-up optics according to the functions performed by the pick-ups.

The form of embodiment of the subject system of this invention described hereinabove is a preferred embodiment, but it is to be understood that variants thereon may be conceived of. Consideration may be given to the case, for example, where the tracer of a missile cannot be seen by pick-up 1 throughout the missile trajectory because its image is no longer detectable beyond a certain distance, or else the situation in which the radiations from a target and the associated missile tend to merge during the terminal part of the trajectory when the missle is nearing the target. In order to allow for such contingencies, the precedingly described system, though comprising the same component parts, can be organized so as to operate somewhat differently. Accordingly, towards the end of the second guidance phase, the missile coordinates $x_3,y_3$ determined by the deviation measuring circuit 12 of pick-up 1 are replaced by the same missile's coordinates $x_4,y_4$ determined by the deviation measuring circuit 22 of pick-up 2, and computing unit 30 translates the target coordinates X,Y seen by pick-up 1 into the system of coordinates of pick-up 2 to permit guidance of the missile on the basis of the differences between these new coordinates and the missile coordinates $x_4,y_4$. In this situation the missile image vanishes from pick-up 1, either by itself in the first of the contingencies considered above, or by being erased through the agency of means well known per se such as a filter if the second of the above contingencies obtains.

It is to be noted that, in this alternative embodiment, processing of the missile by pick-up 2, then by pick-up 1, and thereafter by pick-up 2 again has the advantage of providing automatic harmonization of the optical axes of the two pick-ups 1 and 2, as with the preferred form of embodiment in which any errors in parallelism between the optical axes of the two pick-ups remain without effect on the precision of the results obtained, since their influence is eliminated by the method used for determining missile-target deviations.

We claim:

1. A method of guiding passive missiles fired from a helicopter in particular at multiple targets, comprising the steps of observing and locating each of the targets and the missiles by image forming optronic pick-ups, transmitting their information in the form of electric signals, launching several missiles successively and guiding them simultaneously to their respective targets by electronically determining the angular coordinates of a target after selection and pursuit of the corresponding image formed by a pick-up, and by guidance of each missile toward the target according to the differences between the angular coordinates of the target and the angular coordinates of the missile, which coordinates are determined in a first phase with a large field and in a second phase in a small field of vision after selection and pursuit of the corresponding image received by said pick-ups.

2. A method as claimed in claim 1, characterized by the fact that two simultaneously operating optronic pick-ups having parallel and jointly orientable aim boresights are used to perform the following operations:
   (a) observation, detection and identification of targets from an image supplied by one of the pick-ups—which are then directed at the targets—and appearing in display means;
   (b) acquisition of a target by manually controlled tagging thereof on the image supplied by one of the pick-ups and appearing in the display means;
   (c) electronic determination of the coordinates and tracking of said target viewed by said pick-up;
   (d) firing of a missile and electronic detection thereof when it penetrates into the field of view of one of the pick-ups;
   (e) electronic determination of the coordinates and tracking of said missile according to the data supplied by the pick-ups;
   (f) computation of the differences between the coordinates of the target and those of the corresponding missile and generation of guidance commands sent to said missile.

3. A method as claimed in claim 2, characterized by the fact that use is made of two pick-ups each of which offers a large field of view and a small field of view.

4. A method as claimed in claim 3, characterized by the fact that the targets are observed with the large field of view and target identification, acquisition, coordinate determination and tracking are effected with the small field of view.

5. A method as claimed in claim 3 or claim 4, characterized by the fact that detection of a missile subsequent to firing of the same is effected with the large field of view.

6. A method as claimed in any one of claims 3 or 4, characterized by the fact that guidance of a missile to a target during the first phase is effected by sending guidance commands generated by comparing the large-field missile coordinates with the large-field target coordinates, the latter coordinates being computed from the small-field target coordinates.

7. A method as claimed in any one of claims 2 through 4, characterized by the fact that target acquisition and target coordinate determination and target tracking during both phases, and of missiles during the second phase, are effected by one of the pick-ups (termed the first pick-up) operating with the small field of view, and that missile detection, coordinate determination and tracking during the first phase are effected with the other pick-up (termed the second pick-up) operating with the large field of view.

8. A method as claimed in claim 7, characterized by the fact that during the second phase the second pick-up is used with the small field in order to determine therein the coordinates of a guided missile whereby to generate steering commands to be sent thereto.

9. A method as claimed in claim 7, characterized by the fact that the first pick-up is a pick-up suitable for night vision and the second pick-up is a daylight vision pick-up.

10. A system for guiding passive missiles launched from an aircraft toward multiple targets comprising
    (a) two optronic pick-ups;
    (b) selection means for selecting the fields of view of each pick-up whereby to endow them with a large field and/or a small field of view;
    (c) display means for displaying the images furnished by the respective pick-ups;
    (d) tagging means for manually tagging the targets seen on the respective display means;
    (e) electronic circuits for receiving the electric signals delivered by the pick-ups and determining the target and missile coordinates respectively; and
    (f) a computing unit which, jointly with said electronic circuits, generates commands to be sent to the missiles to direct them to their targets.

11. A system as claimed in claim 10, characterized by the fact that the electronic circuits are three in number and have similar structures, two of them being connected to the first pick-up and respectively determining the coordinates of the targets and the coordinates of the missiles seen by that pick-up, the third being connected to the second pick-up and determining the coordinates of the missiles seen by the second pick-up.

12. A system as claimed in claim 11, characterized by the fact that each electronic circuit includes a common section associated to as many special-purpose sections as there are targets or missiles to be processed simultaneously, each special-purpose section forming together with the common portion a deviation measuring loop capable of supplying the coordinates of a target or a missile.

13. A system as claimed in claim 12, characterized by the fact that each deviation measuring loop includes an electronic window generator located in said common portion and generating one or more windows which, through the agency of a gain control circuit operating on the electric signal delivered by the corresponding pick-up, delineates a partial field within which only the signals received by the pick-up are processed.

14. A system as claimed in claim 13, characterized by the fact that tagging of a target is accompanied by the generation of a corresponding window which surrounds the image of said target received by the first pick-up.

15. A system as claimed in claim 13 or claim 14, characterized by the fact that a first peripheral standby window for awaiting a missile in the large field of view of the second pick-up is formed on the fringe of said field.

16. A system as claimed in claim 13 characterized by the fact that a second window which frames and follows the image of a missile seen in the large field of the second pick-up is formed upon entry of said missile in that field.

17. A system as claimed in claim 16, characterized by the fact that a third standby window for awaiting a missile in the small field of the first pick-up is generated on the basis of the coordinates of the missile seen in the large field of the second pick-up and framed by the second window, said third window following the missile image when the same is received in the small field of view of the first pick-up.

18. A system as claimed in claim 16 or claim 17, characterized by the fact that a fourth standby window for awaiting a missile in the small field of the second pick-up is generated on the basis of the coordinates of the missile seen in the large field of said pick-up and framed by the second window, said fourth window following the missile image when the same is received in the small field of the second pick-up.

19. A system as claimed in claim 17, characterized by the fact that the computing unit is devised to perform the following functions:
(a) translation, during the first guidance phase of a missile, of target coordinates determined in the small field of the first pick-up into coordinates such as they would be obtained in the large field of view of the second pick-up, followed by comparison of these new target coordinates with the corresponding missile coordinates determined with the large field by the deviation measuring loop of the second pick-up, and lastly generation, on the basis of the differences between these coordinates, of guidance commands sent to the missile;
(b) translation, for the purpose of the second guidance phase of a missile, of the coordinates thereof determined by the deviation measuring loop of the second pick-up into coordinates such as they would be obtained if the missile were seen in the small field of the first pick-up, these new coordinates being used to prepare the third standby window for awaiting the missile in the small field of the first pick-up;
(c) comparison, during the second phase, of target and missile coordinates respectively determined with the small field by the deviation measuring loops of the first pick-up and generation, from the differences between these coordinates, of guidance commands sent to the missile;
(d) generation, during the second phase, from changes in a missile's coordinates determined with the small field by the deviation measuring loop of the second pick-up, of steering commands sent to said missile.

20. A system as claimed in claim 19, characterized by the fact that, at the end of the second phase, the commands for guiding a missile towards a target are generated by the computing unit by comparing the coordinates of the missile seen in the small field of the second pick-up with the coordinates of the target seen in the small field of the first pick-up, these last coordinates being translated beforehand by the computing unit into coordinates such as would be obtained in the small field of the second pick-up, the image of the missile in the first pick-up being erased at the same time.

21. A system as claimed in claim 19 or claim 20, characterized by the fact that the computing unit is devised to simultaneously process the signals received by the pick-ups from a plurality of targets and/or missiles.

22. A system as claimed in claim 10 characterized by the fact that the images formed in the optronic pick-ups are analysed by sequential scanning and that the target and missile coordinates are determined, in respect of the first pick-up, by counting the number of lines and the number of spots on a line between reference axes and that point on the image which corresponds to a target or a missile, and, in respect of the second pick-up, by counting the numbers of alternately horizontal and vertical lines between reference axes and the lines which intersect at that point on the image which corresponds to a missile.

23. A system as claimed in claim 10 characterized by the fact that the first pick-up is provided with optical means endowing it with either a large field or a small field by switching therebetween.

24. A system as claimed in claim 10 characterized by the fact that the second pick-up is provided with optical means endowing it with a large field, a small field, or both, by switching therebetween.

25. A system as claimed in claim 10 characterized by the fact that the band of visible or invisible optical frequencies received by each pick-up is optimized by filtering.

26. A system as claimed in claim 10 characterized by the fact that the pickups are supported on a stabilized platform which can be orientated by means of a control stick and which is slaved to the position of a target after the same has been acquired, said target being selected by the gunner-operator.

* * * * *